(12) United States Patent
Lorscheider (10) Patent No.: US 9,738,117 B1
(45) Date of Patent: *Aug. 22, 2017

(54) DOUBLE-STEP OFFSET AXLE

(71) Applicant: Brent Lorscheider, Eugene, OR (US)

(72) Inventor: Brent Lorscheider, Eugene, OR (US)

( * ) Notice: Subject to any disclaimer, the term of this patent is extended or adjusted under 35 U.S.C. 154(b) by 37 days.

This patent is subject to a terminal disclaimer.

(21) Appl. No.: 14/835,647

(22) Filed: Aug. 25, 2015

Related U.S. Application Data

(63) Continuation-in-part of application No. 13/456,534, filed on Apr. 26, 2012, now Pat. No. 9,145,029, which is a continuation-in-part of application No. 13/068,897, filed on May 23, 2011, now abandoned.

(60) Provisional application No. 61/396,240, filed on May 24, 2010.

(51) Int. Cl.
*B60B 35/04* (2006.01)
*B62K 25/02* (2006.01)

(52) U.S. Cl.
CPC .............. *B60B 35/04* (2013.01); *B62K 25/02* (2013.01); *B60B 2900/911* (2013.01); *B60Y 2200/12* (2013.01)

(58) Field of Classification Search
CPC .... B60B 35/04; B60B 2900/911; B62K 25/02
See application file for complete search history.

(56) References Cited

U.S. PATENT DOCUMENTS

| | | |
|---|---|---|
| 423,051 A | 3/1890 | Haven |
| 456,604 A | 7/1891 | Thompson |
| 605,182 A | 6/1898 | Johnston |
| 1,679,819 A | 8/1928 | Fageol |
| 2,125,568 A | 8/1938 | Huyssen et al. |
| 2,395,230 A | 2/1946 | Lucas |
| 2,428,148 A | 9/1947 | Dawson |
| 2,555,480 A | 6/1951 | Fischer |
| 3,084,950 A | 4/1963 | Rass |

(Continued)

FOREIGN PATENT DOCUMENTS

JP    03167094 A    7/1991

OTHER PUBLICATIONS

Rekluse e-Axle Brochure, 2012.
(Continued)

*Primary Examiner* — Kip T Kotter (57) ABSTRACT

A one-piece axle comprised of three cylindrical parallel sections: a large end, a center section, and a small end concentric with the large end. The three sections are separated by an eccentric large step, and an eccentric small step. The center section is located between the two steps and is offset from the large and small ends. The center section locates and supports a front wheel of a cycle. The axle is connected to a first split axle housing and a second split axle housing located at the bottom of each of a first fork and a second fork of a cycle respectively, whereby said housings are pinched to form direct rigid and rotationally secured connections between the respective split axle housings and the large and small ends. The position of the front wheel axis of rotation relative to the forks is adjusted by rotating the axle in the split axle housings before the housings are pinched. The axle allows quick and easy adjustments of the front wheel, affecting cycle steering and handling characteristics.

15 Claims, 5 Drawing Sheets

(56) References Cited

U.S. PATENT DOCUMENTS

| | | |
|---|---|---|
| 3,336,046 A | 8/1967 | Selling |
| 3,371,944 A | 3/1968 | Daniels |
| 3,521,904 A | 7/1970 | Sheffer |
| 3,647,241 A | 3/1972 | Huyssen |
| 3,717,361 A | 2/1973 | Vanderpool |
| 3,770,295 A | 11/1973 | Sword |
| 3,799,581 A | 3/1974 | Munn |
| 3,817,120 A | 6/1974 | Clay |
| 3,831,977 A | 8/1974 | Osborne et al. |
| 3,971,571 A | 7/1976 | Yoshioka |
| 4,082,307 A | 4/1978 | Tait |
| 4,184,695 A | 1/1980 | Roe et al. |
| 4,260,170 A | 4/1981 | Terai et al. |
| 4,421,308 A | 12/1983 | Nagy |
| 4,565,384 A | 1/1986 | Dehnisch |
| 4,588,232 A | 5/1986 | Kim et al. |
| 4,602,822 A | 7/1986 | Kim et al. |
| 4,624,470 A | 11/1986 | Love |
| 4,638,881 A | 1/1987 | Morioka et al. |
| 4,755,005 A | 7/1988 | Tsai |
| 4,756,547 A | 7/1988 | Trema |
| 4,776,609 A | 10/1988 | Pan et al. |
| 4,834,412 A | 5/1989 | Trema |
| 4,875,543 A | 10/1989 | Verkuylen |
| 4,889,354 A | 12/1989 | Wen |
| 4,952,196 A | 8/1990 | Chilcote et al. |
| 4,993,734 A | 2/1991 | Trema |
| 5,002,295 A | 3/1991 | Lin |
| 5,165,762 A | 11/1992 | Phillips |
| 5,233,885 A | 8/1993 | Lin et al. |
| 5,238,259 A | 8/1993 | Wilson et al. |
| 5,240,087 A | 8/1993 | Parker |
| 5,249,847 A | 10/1993 | Lee |
| 5,363,633 A | 11/1994 | Masaru |
| 5,413,368 A | 5/1995 | Pong et al. |
| 5,417,305 A | 5/1995 | Parker |
| 5,553,878 A | 9/1996 | Davignon et al. |
| 5,588,662 A | 12/1996 | Fortier |
| 5,851,165 A | 12/1998 | Wei et al. |
| 5,967,538 A | 10/1999 | Callaluca et al. |
| 6,109,635 A * | 8/2000 | Maeda ................ B62K 25/02 280/276 |
| 6,152,472 A | 11/2000 | Woodside |
| 6,155,370 A | 12/2000 | Iwai et al. |
| 6,186,918 B1 | 2/2001 | Yoo |
| 6,230,849 B1 | 5/2001 | Lumpkin |
| 6,260,869 B1 | 7/2001 | Hanlon et al. |
| 6,371,571 B1 | 4/2002 | Tsan |
| 6,374,975 B1 | 4/2002 | Schlanger |
| 6,412,803 B1 * | 7/2002 | Lalikyan ............... B62K 25/02 280/276 |
| 6,474,432 B1 | 11/2002 | Schmidt et al. |
| 6,485,043 B2 | 11/2002 | Ito et al. |
| 6,536,550 B2 | 3/2003 | Schmidt et al. |
| 6,609,721 B2 | 8/2003 | Clift, Jr. |
| 6,708,999 B1 | 3/2004 | Baltes et al. |
| 6,904,641 B2 * | 6/2005 | Magoto ................ B60B 33/04 16/19 |
| 6,926,297 B2 | 8/2005 | Czysz |
| 6,966,571 B2 | 11/2005 | Czysz |
| 7,125,029 B2 | 10/2006 | Knox et al. |
| 7,273,259 B2 | 9/2007 | Fukui |
| 7,347,438 B2 | 3/2008 | Raddin |
| 7,669,870 B2 | 3/2010 | Eaton |
| 9,145,029 B2 * | 9/2015 | Lorscheider ......... B60B 35/004 |
| 2002/0060441 A1 | 5/2002 | Feng |
| 2002/0167150 A1 | 11/2002 | Clift |
| 2004/0140709 A1 * | 7/2004 | Kanehisa ............ B60B 27/0005 301/110.5 |
| 2008/0067861 A1 * | 3/2008 | Eaton .................... B60B 27/02 301/125 |
| 2009/0121446 A1 | 5/2009 | Mercat |

OTHER PUBLICATIONS

While Industries, Fixed/Free Extension Hubs, at <http://sheldonbrown.com/harris/white-hubs.html>, last accessed Mar. 6, 2012.

\* cited by examiner

DOUBLE-STEP OFFSET AXLE

PRIORITY

This application is a continuation-in-part of U.S. application Ser. No. 13/456,534 filed Apr. 26, 2012, titled "Double-Step Offset Axle," which is a continuation-in-part and claims the benefit of U.S. application Ser. No. 13/068,897 filed May 23, 2011, titled "Double-Step Offset Axle," which claims the benefit of U.S. Provisional Patent Application No. 61/396,240, filed May 24, 2010, titled "Step-Tapered Offset Axle for Motorcycle Front Wheel," each of which is incorporated by reference in its entirety into this application. This application also claims the benefit of U.S. Pat. No. 9,145,029 issued on Sep. 29, 2015 granted from U.S. application Ser. No. 13/456,534.

BACKGROUND

Cycles often utilize an axle to connect a cycle front wheel to two cycle forks, the axle secured by axle housings located at the bottom of the forks, the axle supporting the front wheel. The forks are often connected to a cycle frame with a steering stem and triple clamps. The location of the front wheel axle relative to the steering stem determines two important attributes commonly referred to as the "trail" and the "rake," the rake also referred to as the "steering angle or castor".

The trail and rake are significant factors determining a cycle's handling and steering characteristics. The prior art for changing trail and rake include, but are not limited to: varied offset retrofitted triple clamps; adjustable offset triple clamps; adjustable axle carriers; adjustable stems; and adjustable eccentric axles. A simple one-piece offset axle is needed to provide cycle handling adjustments.

SUMMARY

A one piece rigid offset axle is comprised of a large end, a center section eccentric with the large end, and a small end concentric with the large end. The large and small ends are respectively housed in a first pinchable split axle housing and a second pinchable split axle housing located at a bottom of a first fork and a second fork respectively, of a cycle. The center section locates and supports a wheel hub of the cycle wheel.

The center section is offset from the large and small end. The axle has an offset range that is equal to twice the center section offset.

The rotation of the axle within the housings moves the center section axis to a plurality of points along a circular path, relative to the forks.

Rotation of the axle in the split axle housings, before the housings are pinched, adjusts the location of the center section and the front wheel axis of rotation relative to the forks and steering stem. Adjusting the location of the front wheel axis of rotation relative to the forks and steering stem alters the chassis or frame geometry and affects the handling and steering characteristics of the cycle.

A one-piece double-step axle is installed through the first fork split axle housing, the wheel hub, and the second fork axle housing. Removal is the reverse of installation.

BRIEF DESCRIPTION OF THE DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings identified below.

DETAILED DESCRIPTION

Reference will now be made to figures wherein like structures will be provided with like reference designations. It is understood that the drawings are diagrammatic and schematic representations of exemplary embodiments of the present invention, and are neither limiting nor necessarily drawn to scale.

The embodiments described herein pertain to axles used to connect the front wheel to motorcycles and bicycles, herein referred to as cycles. For descriptive purposes only, the embodiments are presented to illustrate how the invention proposed herein could be applied to a motorcycle or bicycle and do not limit the application of this invention to other parts of a motorcycle or bicycle, or other cycle types.

The inventive one-piece double-step offset axle has three cylindrical parallel sections: a large end, a center section, and a small end. The three sections are separated by two eccentric steps, a large step and a small step. The small end is concentric with the large end, the center section is offset from both ends. The large and small ends are connected to a first and a second fork by a split axle housing located at the bottom of a first fork and second fork of the cycle respectively. Said housings are pinchable, directly engage the axle ends, and are pinched to form rigid and rotationally resisting connections between the respective housings and the large and small ends. For illustrative purposes, all embodiments described herein have one-piece pinchable housings.

The small end is configured to apply a first inward longitudinal force. For illustrative purposes only, the embodiments herein have small ends configured to apply said force with a distally located fastener.

The large end is configured to apply a second inward longitudinal force. For illustrative purposes only, the large end configurations presented herein have a large end configured to apply said force with either a continuous large step or with a large end cap.

The center section locates and supports a wheel hub of the cycle wheel. The longitudinal center axis of the center section is referred to as the center axis. The center section axis is parallel to and offset from the ends axis. The perpendicular distance between the ends axis and the center axis is the offset distance. The offset range is twice the offset distance.

The axle is rotated within the split axle housings, the rotation moves the center section axis to a plurality of points along a circular path, relative to the forks. Rotation of the axle in the split axle housings, before the housings are pinched, adjusts the location of the center section and the front wheel axis of rotation relative to the forks and steering stem. Adjusting the location of the front wheel axis of rotation relative to the forks and steering stem alters the chassis or frame geometry and affects the handling and steering characteristics of the cycle.

The axle is installed through the first fork split axle housing, the wheel hub, and the second fork axle housing. Removal is the reverse of installation.

Figure 1A:
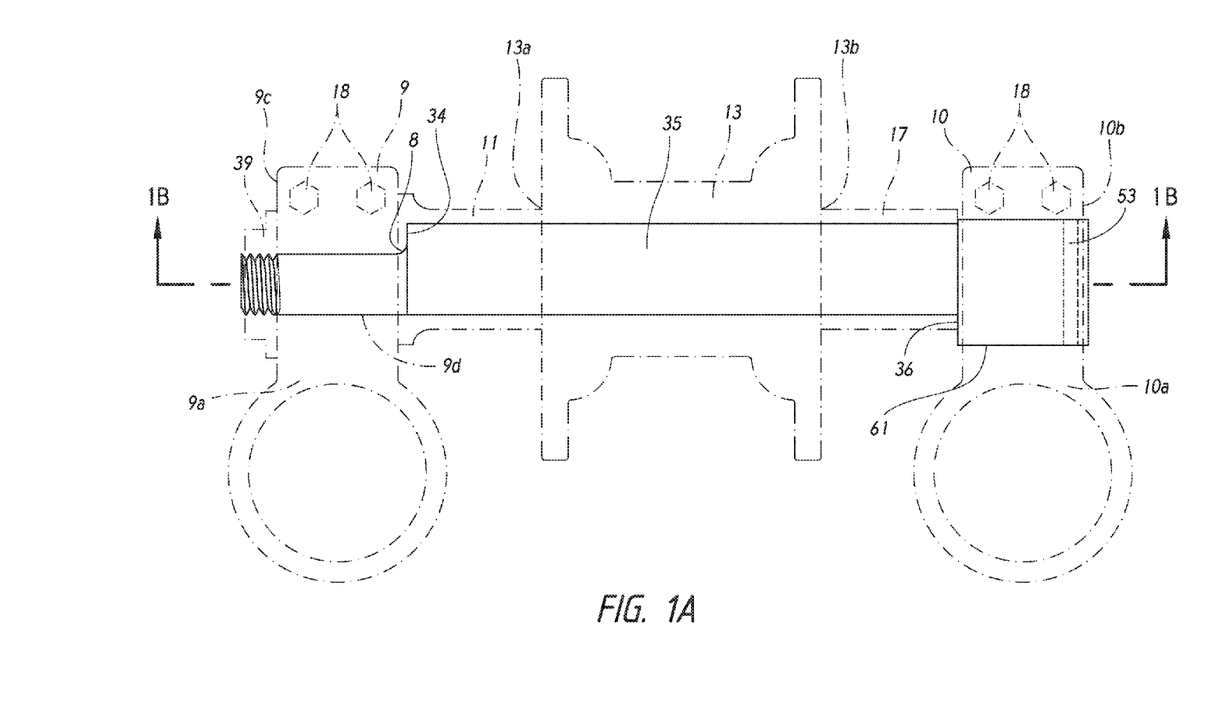
FIG. 1A is a top view of an embodiment having a continuous large end step.
Figure 1B:
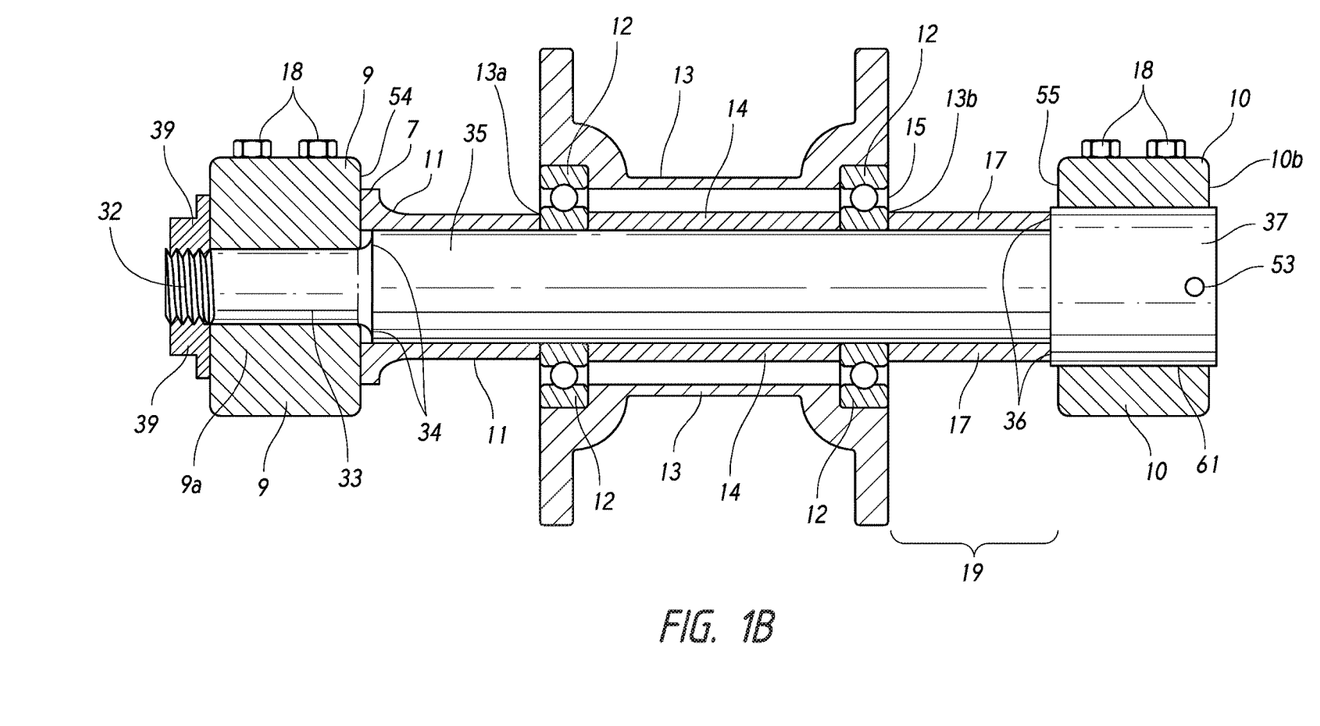
FIG. 1B is a cross-sectional view of FIG. 1A.

FIGS. 1A and 1B show an embodiment, with the large end configuration of a continuous large end step, in a first and second cycle front fork bottoms with the center section directed forward toward the front of the cycle. FIG. 1A includes a fastener nut 39, axle pinch bolts or pinch nuts 18, a small step 34, a small step fillet 8, a second spacer 11, a center section 35, a wheel hub 13 of a front wheel, a first side of the wheel hub 13b, a second side of the wheel hub 13a, a first spacer 17, a large step 36, a first fork bottom end 10a and the first fork axle housing 10, axle housing pinch bolts or pinch nuts 18, a large end pin 53, and a second fork bottom end 9a and second fork axle housing 9 having a second housing inner face 54. The wheel hub 13 is supported on the center section 35 and is centered laterally between front forks by the second spacer 11 and the first spacer 17. The large end is housed in the first fork axle housing 10, the housing having an inner face 55, an outer face 10b, and a bore 61. The small end is housed in the second fork axle housing 9, the housing having an inner face 54, an outer face 9c, and a bore 9d. For clarity purposes, the axle in FIG. 1B is shown as a top view. FIG. 1B shows the large step range 19 extending from a point substantially inside the first housing inner face 55 to an outer wheel bearing face 15 of the first side of the wheel hub. This distance represents the possible locations of a large step. FIG. 1B shows a distally located fastener of the small end. For illustrative purposes only, this embodiment has a fastener 39 consisting of a threaded tip 32 of the small end and a fastener nut 39, the nut receiving the threaded tip. FIG. 1B shows a small end 33, a large end 37, wheel hub bearings 12, and a wheel hub spacer 14.

Figure 2A:
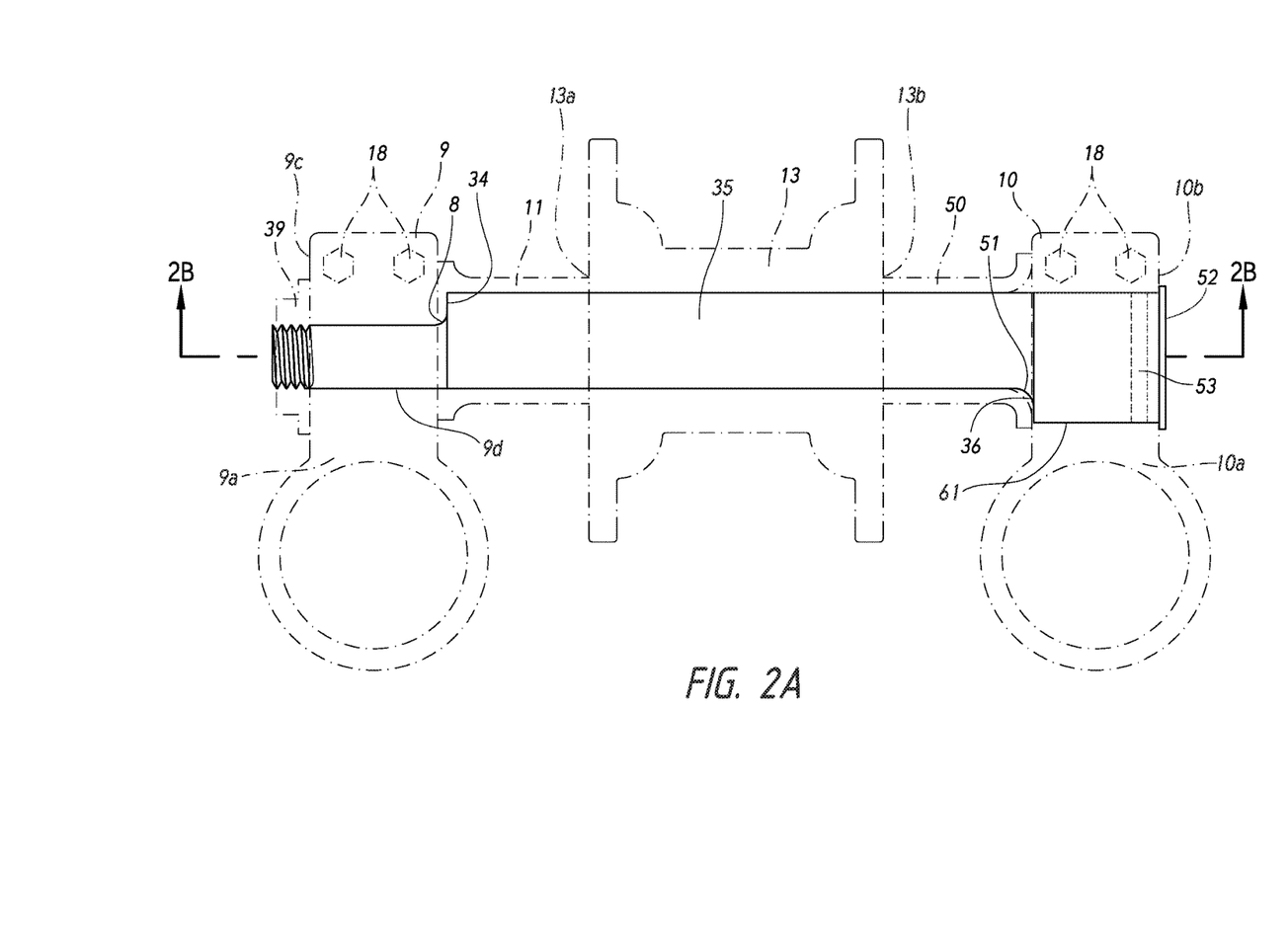
FIG. 2A is a top view of an embodiment having a large end cap.
Figure 2B:
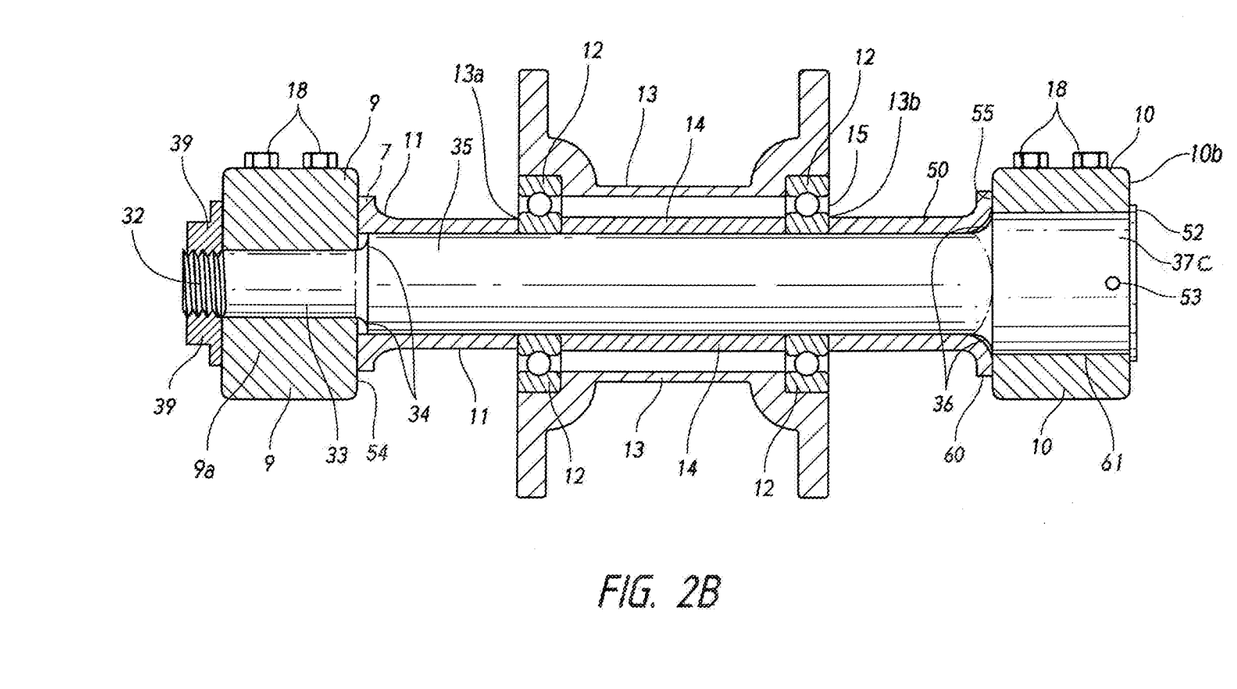
FIG. 2B is a cross-sectional view of 2A.

FIGS. 2A and 2B show an embodiment, with the large end configuration of a large end cap 52, the embodiment housed in a first and second cycle front fork bottom ends with the center section directed forward toward the front of the cycle. FIG. 2A includes a fastener nut 39, axle pinch bolts or pinch nuts 18, a small step 34, a small step fillet 8, a second spacer 11, a center section 35, a wheel hub 13 of a front wheel, a second side of the wheel hub 13a, a first side of the wheel hub 13b, a first spacer 50, a large step 36, a large step fillet 51, a first fork bottom end 10a and first fork axle housing 10, axle housing pinch bolts or pinch nuts 18, a large end pin 53, a second fork bottom end 9a, and second fork axle housing 9. The wheel hub 13 is supported on the center section 35 and is centered laterally between front forks by the second spacer 11, the first spacer 50 and a spacer flange 60. The large end is housed in the first fork axle housing 10, the housing having an inner face 55, an outer face 10b, and a bore 61. The small end is housed in the second fork axle housing 9, the housing having an inner face 54, an outer face 9c, and a bore 9d. For clarity purposes, the axle in FIG. 2B is shown in plan view. FIG. 2B shows a distally located fastener of the small end, for illustrative purposes only, this embodiment has a fastener consisting of threads 32 of the small end received by a fastener nut 39. FIG. 2B shows a small end 33, a large end 37c, wheel hub bearings 12, and a wheel hub spacer 14.

Figure 3:
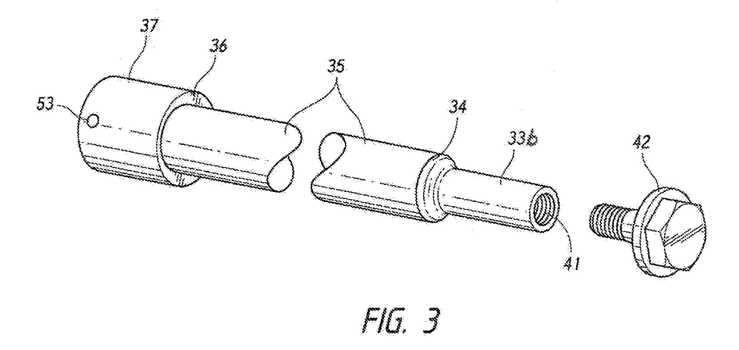
FIG. 3 is a perspective view of an embodiment with an axle bolt.

For illustrative purposes only, FIG. 3 is an embodiment having a fastener consisting of threaded hole 41 of the small end receiving a fastener bolt 42 a large end 37 and a small end 33b.

Figure 4:
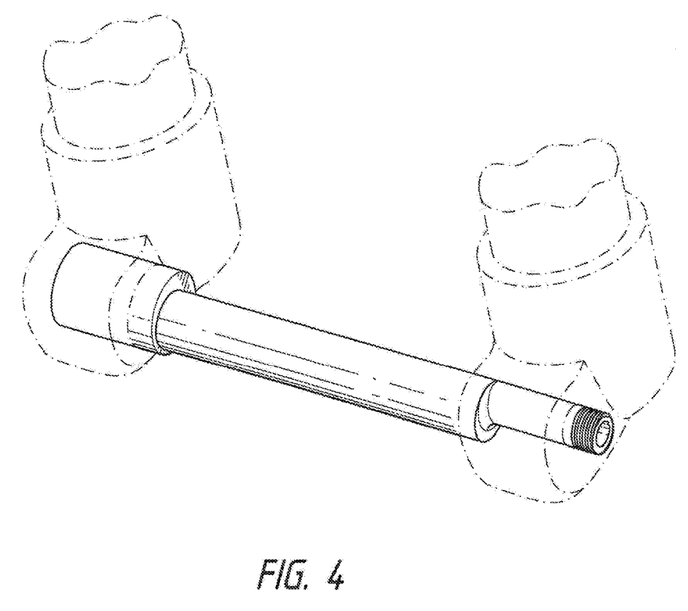
FIG. 4 is a perspective front view of an embodiment installed in two front forks.

FIG. 4 is a perspective view of an axle installed in first and second fork bottoms.

The large end has a large end feature for engagement of a tool to apply torque to the axle or to apply a longitudinal force to the axle for extraction purposes. For illustrative purposes only, the large end feature for these embodiments utilize an internal large end pin 53 fixed transversely along the direction of the offset. The axle is rotated in the split axle housings by engagement of the large end feature, the rotation moving the center axis about a circle relative to the forks when viewed from the side of the forks, the circle having a radius equal to the axle offset and a center located on the ends axis when viewed from the side. This circle is the offset circle with a diameter twice the axle offset, the diameter is the offset range.

In a preferred embodiment the axle housings are pinchable one-piece or two-piece split housings and the large and small ends are rotationally and rigidly secured by pinching the split axle housings together. For illustrative purposes only, the embodiments herein utilize pinch bolts or nuts to pinch the split axle housings.

In a preferred embodiment the axle is installed and removed from one side of the front forks by inserting the axle, starting with the small end, through the first fork axle housing, then through the wheel hub, and lastly through the second fork axle housing. The axle also passes through spacers located on either or both sides of the wheel hub to locate and support the wheel hub laterally. The small end fastener is installed but not fastened.

Axle adjustments are accomplished by rotating the axle in the split axle housings, with a tool engaging the large end feature, to a desired position. The adjusted axle is fastened with the fastener, the fastener laterally and rotationally fixing the wheel hub with the first and second inward longitudinal forces.

In a preferred embodiment the axle has the second inward longitudinal force originating from a configuration comprised of either a fastener bolt received by a threaded bore of the small end, or, threads of the small end received by a fastener nut.

A fastened axle is secured by pinching the split axle housings, thereby directly clamping the ends of the axle to form rigid and rotationally-resisting connections between the respective split axle housings and the first and second ends.

An axle can be configured with a plurality of diameters and offset ranges. An axle size is designated by a center section diameter followed by an offset range with an "x" or "by" separating the two dimensions, e.g., 25 mm×6 mm or 1 inch by ¼ inch. The axle can have a hollow center to decrease its weight. The axle is reversible and can be oriented with the large end housed in the right front fork axle housing and the small end in the left front fork axle housing, or oriented with the large end housed in left fork axle housing and the small end housed in the right fork axle housing, provided the fork axle housing is designed accordingly.

A center section diameter is selected equal to the desired wheel bearing internal diameter. A desired offset range is selected. The large end diameter is equal to or greater than the sum of the center section diameter and the desired offset range. The large end transitions to the center section at the large step.

A preferred embodiment of the axle has the first inward longitudinal force originating from a large end configuration having either a substantially continuous large end step or a distally located large end cap, the large end configuration acts upon either the first spacer or the first split axle housing, respectively.

The large step 36 is substantially continuous around its circumference as shown in the embodiment of FIG. 1A, when the large end diameter is substantially larger than the sum of the center section diameter and the desired offset range. Utilizing a substantially continuous large step provides continuous abutment between the large end and a first spacer. The large step is located laterally anywhere in the large step range 19 as shown in FIG. 1B. The large step range extends from a point substantially inboard of the first housing inner face to the outer face of a wheel bearing of the wheel hub. One or more spacers may be utilized between the large step and the wheel hub. The large step could also extend to the outer face of the wheel bearing of the first wheel hub side, in which case a first spacer would not be utilized.

For illustrative purposes only, the embodiment of FIGS. 2A and 2B has a large end cap configured to apply the first inward longitudinal force, the large step located approximately at the inner face of the first fork axle housing, the large end having a fillet or tapering to ease the inside corner of the large step. One or more spacers may be utilized between the large step and the first wheel bearing adjacent the large end. A spacer 50 engages the first fork axle housing inner face 55 as shown in FIG. 2B, a flange 60 of the spacer has sufficient diameter and thickness to effectively bridge the bore 61 of the first fork axle housing and thereby provide continuous abutment. The spacer may be relieved on the outer end of the bore to conform closely to any large step fillet.

The axle can be configured with different diameters and offset ranges. An axle size is designated by a center section diameter followed by an offset range with an "x" or "by" separating the two dimensions, e.g., 25 mm×6 mm or 1 inch by ¼ inch. The axle can have a hollow center to decrease its weight. The axle is reversible and can be oriented with the large end housed in a first fork axle housing and the small end in a second fork axle housing, or oriented with the large end housed in the second fork axle housing and the small end housed in the first fork axle housing, provided the fork axle housings are designed accordingly.

The large end has a feature indicating the rotational position of the axle and location of the center section relative to the front forks when viewed from the side, and to engage a tool to apply torque to the axle and to apply a longitudinal force to extract the axle from an installed position. For illustrative purposes only, this embodiment utilizes a large end pin 53 as the large end feature, the pin fixed transversely across a hollow large end along the direction of the offset.

In a preferred embodiment the second spacer directly abuts the second split axle housing inner face, the second spacer has a flange, the flange has sufficient diameter and thickness to substantially reinforce the connection between the small end and the second split axle housing. The small end, the fastener, the second split axle housing, and the second spacer are configured to continuously abut and apply the second inward longitudinal force against the second side of the wheel hub when the axle is fastened.

For illustrative purposes only, the embodiments of FIGS. 1A and 2A show the small step 34 located just inboard of the inner face 54 of the second fork axle housing 9. FIGS. 1B and 2B show the small step having a fillet to ease the inside corner of the small step and relieve stress, a second spacer 11 located on the center section between the second fork housing and second side of the wheel hub, a flange 7 of the spacer mating directly against the inner face 54 of the second fork axle housing.

Although preferred embodiments of this invention have been described above with a certain degree of particularity, those skilled in the art could make numerous alterations to the disclosed embodiments without departing from the spirit or scope of this invention as described in the specification, drawings and claims. Different materials and design details could be used, such as a hollow axle design for weight reduction, without departing from the spirit or scope of this invention as described in the specification, drawings and claims. All references (e.g., large end, middle section, small end, offset, offset range, offset circle, first fork, second fork, side, ends axis, center axis, large step, small step, large step range, continuous large step, small step fillet, spacers) are only used for identification purposes to aid the reader's understanding of the present invention, and do not create limitations, particularly as to the position, orientation, or use of the invention. Joinder references (e.g., attached, coupled, connected, secured, fixed, and the like) are to be construed broadly and may include intermediate members between a connection of elements and relative movement between elements. As such, such joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the claims.

The invention claimed is:

1. A double step offset axle for adjustment of a cycle wheel, the axle integrally formed as a single structure, the axle connects the cycle wheel to a first and a second fork of a cycle, a first end of the axle is housed in a pinchable split axle housing of the first fork, a second end of the axle is housed in a pinchable split axle housing of the second fork, rotation of the axle within the housings adjusts the cycle wheel to a desired position relative to the cycle forks, wherein the housings are pinched to secure the desired wheel position, the pinched housings directly engage the respective ends of the axle to rotationally and rigidly connect the axle to the forks.

2. The axle of claim 1, wherein the first end of the axle is a large end, the large end is a cylindrical form with an eccentric large step, the large end is configured to apply a first inward longitudinal force.

3. A preferred embodiment of the axle of claim 2, wherein the first inward longitudinal force originates from a large end configuration comprised of either a substantially continuous large end step or a distally located cap of the large end.

4. The axle of claim 2, wherein the second end of the axle is a small end, the small end is a cylindrical form, a diameter of the small end is less than a diameter of the large end, the small end is concentric with the large end, a longitudinal center axis of the small end is aligned with a longitudinal center axis of the large end, the small end is configured to apply a second inward longitudinal force.

5. The axle of claim 4, wherein a center section of the axle is located between, and eccentric with the large and small ends, the center section is a cylindrical form with an eccentric small step, a longitudinal center axis of the center section is parallel to and offset from the aligned longitudinal axes of the large and small ends, the center section locates and supports a wheel hub of the cycle wheel, the wheel hub is laterally centered by a first spacer and a second spacer on the center section, rotation of the axle adjusts the center section to a plurality of locations relative to the forks.

6. The axle of claim 5, wherein the large end includes a large end feature configured to indicate the position of the center section axis relative to the first fork, the large end feature provides rotational engagement to torque the axle and longitudinal engagement to extract the axle from an installed position.

7. The axle of claim 5, wherein the large end is housed in a bore of the first fork split axle housing, the housing has an inner face and an outer face.

8. The axle of claim 7, wherein the small end is housed in a bore of the second split axle housing, the housing has an inner face and an outer face.

9. The axle of claim 8, wherein the first and the second spacers are respectively located between the first fork split axle housing and a wheel hub first side, and the second fork split axle housing and a wheel hub second side.

10. A preferred embodiment of the axle of claim 9, wherein the second spacer directly abuts the inner face of the second fork split axle housing, the second spacer has a flange, the flange of the spacer directly abuts said inner face, the flange has sufficient diameter and thickness to substantially reinforce the connection between the small end and the second fork split axle housing.

11. The axle of claim 9, wherein the first spacer has a first spacer flange in configurations wherein the spacer directly abuts the inner face of the first fork split axle housing, the flange of the spacer directly abuts said inner face, the flange has sufficient diameter and thickness to substantially bridge the bore of the first fork split axle housing.

12. A preferred embodiment of the axle of claim 9, wherein the small end is configured with a distally located fastener to apply the second inward longitudinal force, the fastener fastens the axle to the wheel hub.

13. The axle of claim 12, wherein the first and second spacers, are configured to apply, through continuous abutment, the respective first and second inward longitudinal forces from the respective large and small ends, the first and second inward longitudinal forces applied to the respective sides of the wheel hub, the first and second inward longitudinal forces laterally securing the wheel hub to the axle.

14. The axle of claim 13, wherein the axle is connected to the cycle forks by pinching the split axle housings, the pinched housings directly engage and clamp the respective axle ends to form rigid and rotationally secured connections between the respective split axle housings and the large and small ends.

15. A preferred embodiment of the axle of claim 12, wherein the fastener is comprised of either a bolt received by a threaded bore of the small end, or, of threads of the small end received by a nut.

* * * * *